(12) United States Patent  
Castaneda et al.

(10) Patent No.: US 7,202,905 B2  
(45) Date of Patent: Apr. 10, 2007

(54) ELECTRONIC DEVICE HAVING A MOTOR PROVIDING VIBRATION AND CAMERA ADJUSTMENT FUNCTIONALITY

(75) Inventors: Julio C. Castaneda, Coral Springs, FL (US); Donald W. Burnette, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 176 days.

(21) Appl. No.: 10/729,041

(22) Filed: Dec. 5, 2003

(65) Prior Publication Data

US 2005/0122423 A1 Jun. 9, 2005

(51) Int. Cl.
*H04N 5/225* (2006.01)
(52) U.S. Cl. ...................................... 348/373
(58) Field of Classification Search .............. 348/373; 310/81
See application file for complete search history.

(56) References Cited

U.S. PATENT DOCUMENTS

| | | | |
|---|---|---|---|
| 5,973,439 A | * | 10/1999 | Nishio et al. .......... 310/323.12 |
| 6,133,657 A | * | 10/2000 | Semenik et al. .............. 310/81 |
| 2003/0117497 A1 | * | 6/2003 | Nicolaisen et al. .... 348/207.99 |
| 2003/0222988 A1 | * | 12/2003 | Koreki et al. .......... 348/207.99 |

FOREIGN PATENT DOCUMENTS

JP 2003-315656 * 11/2003

OTHER PUBLICATIONS

English translation of JP-2003-315656.*

* cited by examiner

*Primary Examiner*—Vivek Srivastava
*Assistant Examiner*—James M. Hannett

(57) ABSTRACT

An electronic device, such as a radio communication device, includes a motor (102) that can operate in a first mode where it provides a vibration feature and a second mode where it can adjust the focus of a camera assembly (118). When in the second mode, a motor shaft (106) is caused to engage with a worm gear (108) that moves a gear (112) found in the camera assembly (118). The worm gear (108) causes an adjustment in the camera's lens in order to adjust the camera's focus when the motor shaft (106) is turned either clockwise or counter-clockwise.

20 Claims, 4 Drawing Sheets

ELECTRONIC DEVICE HAVING A MOTOR PROVIDING VIBRATION AND CAMERA ADJUSTMENT FUNCTIONALITY

TECHNICAL FIELD

This invention relates in general to the field of electronics, and more specifically to an electronic device having a motor that provides vibration and camera adjustment functionality.

BACKGROUND

As cameras begin to be used more and more in electronic devices such as cellular telephones, there is a need for such built-in cameras to have functionality similar to other film and/or digital cameras. One such function is the optical zoom and/or Auto Focus (AF) feature found in both regular and digital cameras. Typically this optical zoom or AF is accomplished by using an electric motor which adjusts the camera lens in order to properly focus the camera.

Another common function found in most cellular telephones is that of a vibration device that provides a quiet alert to the telephone user. The vibration feature is sometimes accomplished using a motor that generates a vibration when the motor turns. Given the need for smaller and lower priced radio communication devices, it would be desirable to have a design that would solve some of the problems/needs previously mentioned.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
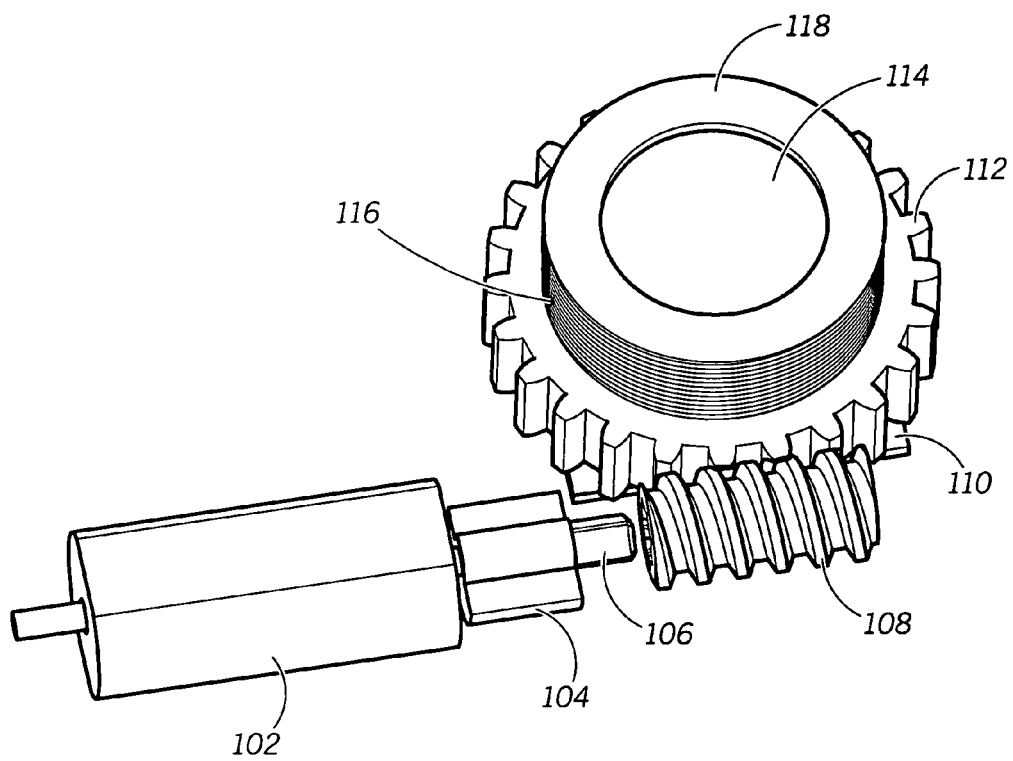
FIG. 1 shows a diagram of a two position motor (motor shown in its first position or vibration position) providing both vibration and camera lens adjustment in accordance with an embodiment of the invention.

While the specification concludes with claims defining the features of the invention that are regarded as novel, it is believed that the invention will be better understood from a consideration of the following description in conjunction with the drawing figures.

In FIG. 1, there is shown a diagram of a motor 102 such as a two position electric brush motor that can provide both vibration and camera adjustment features in accordance with an embodiment of the invention. In FIG. 1, the motor 102 is shown in its first operating position or mode whereby the motor shaft 106 is not engaged to worm gear 108. A counterweight 104 fitted to the motor shaft 106 helps provide a vibration feature for use in an electronic device such as a cellular telephone. For the vibration mode, the motor speed will be typically about 6,000 to 8,000 Revolutions-Per-Minute (RPM).

Also shown in FIG. 1, there is shown a focusable camera assembly comprising a moveable camera lens assembly that includes lens 114 and threaded lens housing 118. Threaded lens housing 118 includes threads 116 and gears 112. Threads 116 can thread in and out of mating threads found in the electronic device's housing during the focusing of the adjustable camera lens by motor 102 (see FIG. 9). A camera such as a Charge Coupled Device (CCD) camera 110 lies directly underneath adjustable lens 114. When worm gear 108 is rotated either clockwise or counterclockwise, the gears 112 cause the lens 114 to move closer or further from camera 110 thereby providing an optical zoom feature. Camera 110 is fixed (e.g., mounted on a printed circuit board, etc.), while the lens assembly is adjustable. An AF feature can be provided by using well known AF software which automatically focuses the camera assembly to get the best image.

Figure 2:
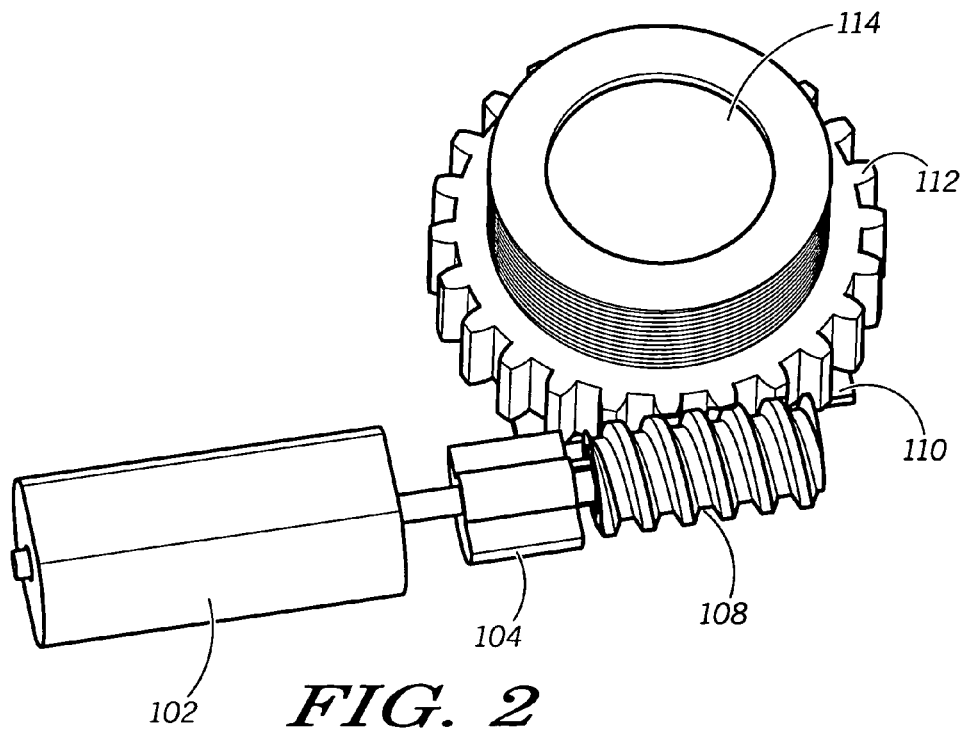
FIG. 2 shows the two position motor shown in FIG. 1, in the motor's second position (or lens adjustment position) in accordance with an embodiment of the invention.

Shown in FIG. 2, is the motor 102 in its second or camera adjustment position whereby the motor shaft 106 (see FIG. 1) has been engaged with worm gear 108. The motor shaft 106 can turn either clockwise or counterclockwise in order to adjust the camera lens and provide AF functionality with the same motor 102 used for the vibration feature. When adjusting the camera lens, the motor speed will be much slower than when the motor is used in the vibration mode in order to avoid any vibration. Further reduction in the gearing can also be provided in order to fine-tune the optical zoom and AF functionality.

Figure 3:
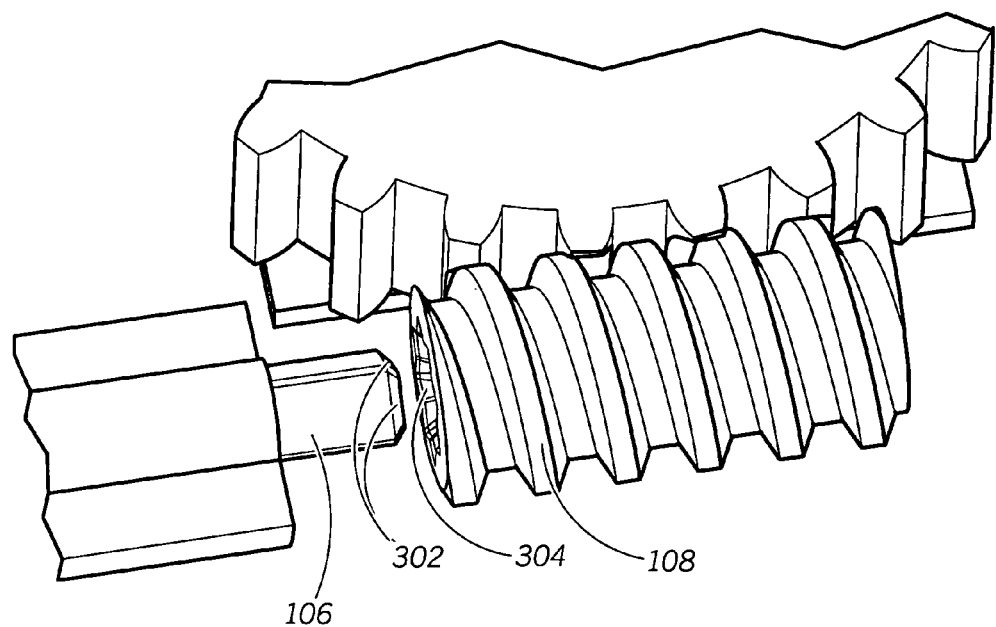
FIG. 3 shows a partial view of the motor shaft and worm gear in accordance with an embodiment of the invention.

Referring now to FIG. 3, there is shown a close-up of the motor shaft 106 and worm gear 108. In order to allow for the motor shaft 106 to engage the aperture on worm gear 108, the motor shaft 106 has chamfered ends 302 and the worm gear aperture or multi-square receptor has chamfered ends 304 as well. The chamfered ends 302 and 304 on both mating parts allow for the motor shaft 106 to engage the worm gear's aperture even if the worm gear is slightly misaligned with the square motor shaft 106.

Figure 4:
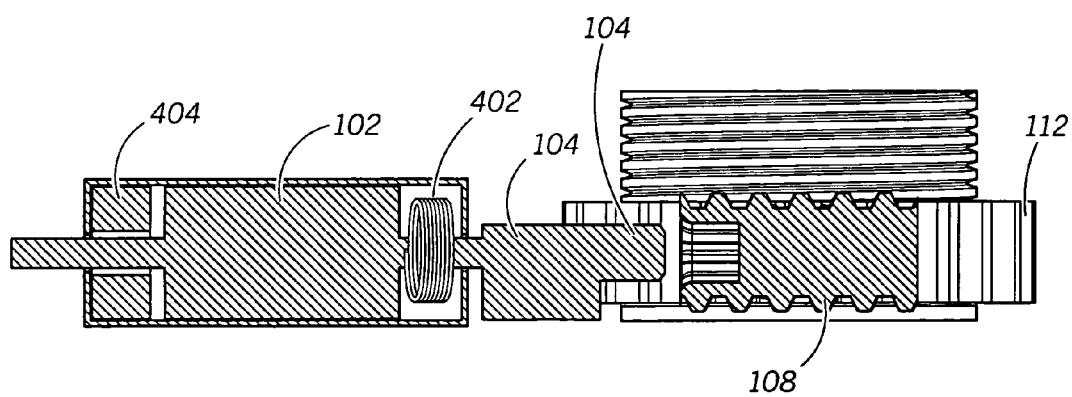
FIG. 4 shows a side cut-out view of the motor and camera in the first or vibrator mode in accordance with an embodiment of the invention.
Figure 5:
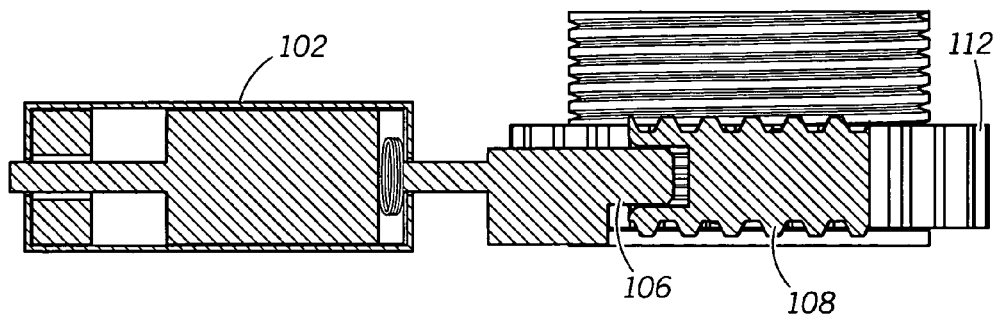
FIG. 5 shows a side cut-out view of the motor and camera assembly in the second or camera adjustment position in accordance with an embodiment of the invention.

In FIG. 4, there is shown a cut-out side view of the motor/camera assembly, with the motor 102 in the first or vibration mode, whereby the motor shaft 106 is not engaged with worm gear 108. The motor 102 includes a rear coil 404 that when energized causes the internal motor assembly to move outward causing spring 402 to compress and the shaft 106 to move out and engage worm gear 108 as shown in FIG. 5. The rear coil provides a magnetic field when energized that causes the internal motor to be repelled away from it.

Figure 6:
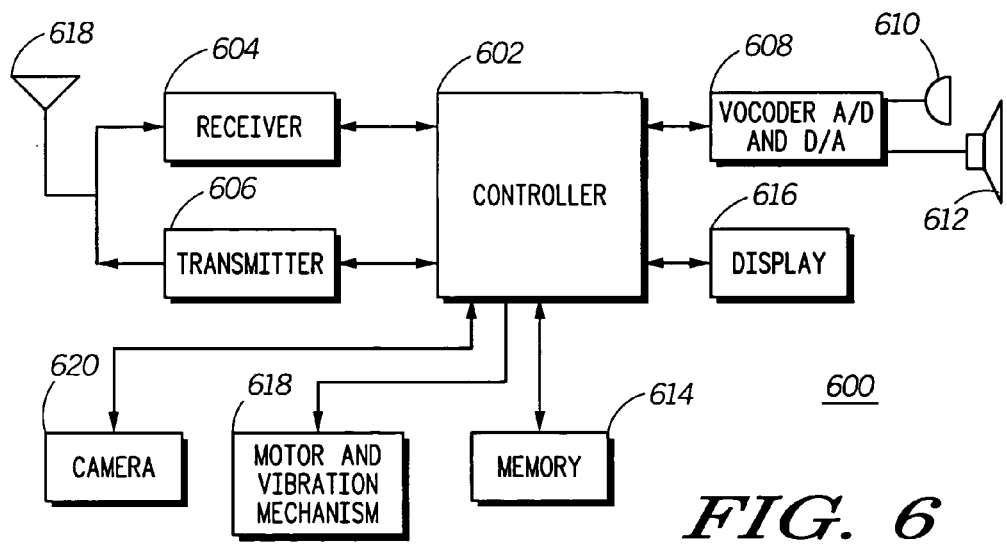
FIG. 6 shows a block diagram of a radio communication device in accordance with an embodiment of the invention.

In FIG. 6, there is shown a block diagram of a radio communion device such as a two-way radio or cellular telephone 600. The radio communication device 600 includes a conventional receiver 604 and transmitter 606 selectively coupled to an antenna 618. A controller 602 such as a microprocessor and/or digital signal processor controls the overall function and operation of the communication device 600. A display 616 is coupled to the controller 602 and allows for user interface with the communication device.

Memory 614 can comprise both volatile and nonvolatile memory including but not limited to Random Access Memory (RAM), flash memory, Read-Only Memory (ROM), etc. Memory 614 also stores the necessary instructions and information for controller 202. Located in memory 614 are all the instructions necessary to perform the motor selection between the vibration mode and the camera adjustment mode.

A microphone 610 is provided for converting voice from the user into electrical signals, while a speaker 612 provides audio signals to the user. A vocoder, Analog-to-Digital (A/D) and Digital-to-Analog (D/A) block 608 provides all the necessary digital voice processing for converting analog voice into digital information ready for RF transmission and vice versa.

A camera 620 and motor having vibration mechanism 618 are coupled to the controller 602. The controller 602 places the motor 618 either in the vibration mode or in the camera mode where it can adjust the focus of camera 620 by sending the appropriate signal to the motor 618. Controller 602 can send a signal to the motor 618 which causes its shaft to extend outward and engage the camera 620 as previously discussed as well as adjust the motor speed and rotation direction.

Figure 7:
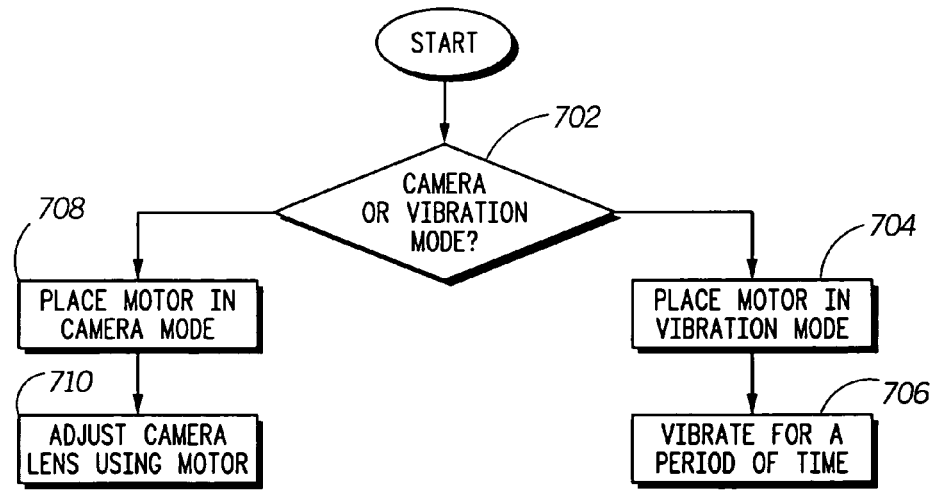
FIG. 7 shows a flowchart highlighting some of the steps taken for selecting either the vibration or camera modes in accordance with an embodiment of the invention.

Referring now to FIG. 7, there is shown a flowchart highlighting some of the steps taken in accordance with the invention. In step 702, it is determined if the motor is going to be placed in the camera mode or the vibration mode of operation. If it is determined to place the motor in the camera mode in step 708 a signal is sent to the motor that causes the motor shaft 106 to extend outward and engage with the worm gear 108. In step 710, the motor adjusts the camera's focus using the motor. If in decision step 702 it is determined to have the motor in the vibration mode, a signal is sent to the motor that causes it to vibrate in step 704. In this mode, the motor will run at a high speed in order to cause the vibration with the help of counter weight 104. In step 706, the motor is left in the vibration mode for a period of time that can be preset or can be selectable by the user. For example, when a telephone call is received and the cellular telephone is in the vibration mode, the motor may cause the cellular telephone to vibrate for a predetermined length of time or until the user activates a switch on the cellular telephone.

Figure 8:
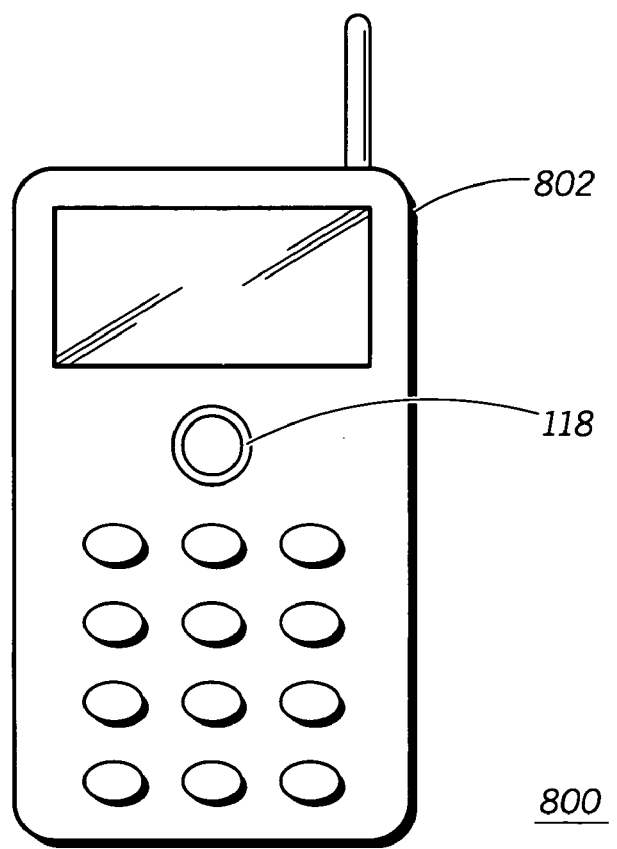
FIG. 8 shows a radio communication device in accordance with an embodiment of the invention.

Shown in FIG. 8 is a radio communication device such as a cellular telephone 800 having a housing 802 and the camera assembly 118 attached to the housing 802. The camera assembly can be focused using the dual use motor of the present invention. Using a motor that can not only vibrate, but can also adjust the focus of a built-in camera on a radio communication device, allows for a smaller overall design and significant cost savings as compared to other designs.

Figure 9:
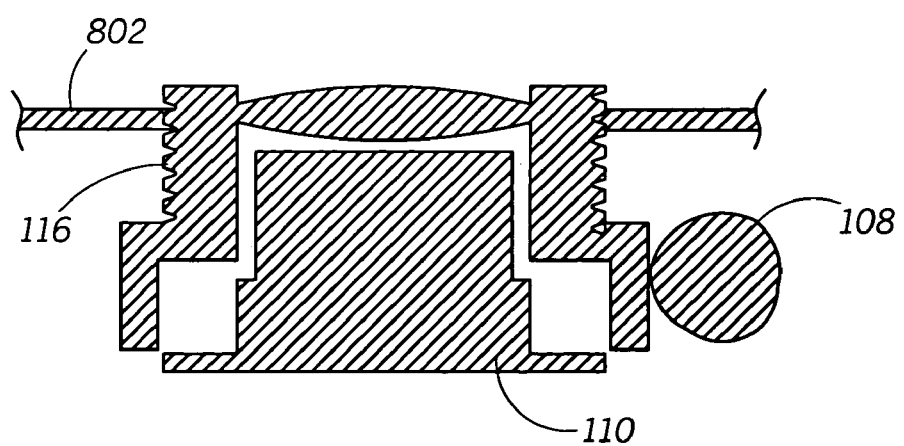
FIG. 9 shows a cross-sectional view of the camera assembly and worm gear found inside of the radio communication device of FIG. 8 in accordance with an embodiment of the invention.

In FIG. 9 there is shown a cross-sectional view of the camera coupled to radio housing 802 and located inside of the radio communication device 800. The camera assembly includes the fixed camera 110 and the adjustable lens assembly. Threads 116 are threaded into/out of radio housing 802 when the worm gear 108 rotates the lens assembly either clockwise or counterclockwise. Although the camera has been illustrated having an adjustable lens assembly that threads into/out of the radio housing, the present invention is not so limited. The present invention can be used with any other type of focusing camera that requires a motor to adjust the focus of the camera.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electronic device, comprising:
    a focusable camera assembly having a lens; and
    a motor operable between a first mode of operation in which it provides a vibration feature and a second mode of operation in which it adjusts the focus of the camera assembly;
    wherein in the first mode of operation, the motor is disengaged from the camera assembly such that the motor does not cause the lens of the camera assembly to move.

2. An electronic device as defined in claim 1, wherein the electronic device comprises a radio communication device.

3. An electronic device as defined in claim 1, wherein the motor comprises an electric brush motor.

4. An electronic device as defined in claim 1, wherein the focusable camera assembly indudes a fixed camera.

5. An electronic device as defined in claim 4, wherein the motor operates at a first rate of speed when in the first mode of operation and in a second rate of speed when in the second mode of operation and the first rate of speed is higher than the second rate of speed.

6. An electronic device as defined in claim 1, wherein the focusable camera assembly further comprises a worm gear and the motor includes a motor shaft that engages the worm gear when the motor is placed in the second mode of operation.

7. An electronic device as defined in claim 6, further comprising a controller and the controller sends a signal to the motor that causes the motor shaft to engage the worm gear.

8. An electronic device as defined in claim 6, wherein the motor shaft has a chamfered end and the worm gear has a chamfered aperture that accepts the motor shaft.

9. An electronic device as defined in claim 6, wherein the motor includes a coil that causes the motor shaft to move outward in the second mode of operation.

10. An electronic device as defined in claim 9, wherein the motor includes an internal motor assembly and a spring that mechanically loads the internal motor assembly.

11. An electronic device as defined in claim 10, further comprising a counter weight coupled to the motor shaft.

12. An electronic device as defined in claim 11, wherein the worm gear mates to a gear found in the camera assembly.

13. A method for providing both camera locus and vibration functionality to a radio communication device having a camera, comprising the steps of:
    (a) determining if a vibration mode or a camera focus mode is desired;
    (b) causing a motor to vibrate if the vibration mode is desired in step (a), wherein the motor is disengaged from the camera lens in the vibration mode such that the motor does not cause the camera lens to move; and (c) causing the same motor used in step (b) to move the camera lens if the camera focus mode was desired in step (a).

14. A method as defined in claim 13, wherein the radio communication device comprises a cellular telephone.

15. A method as defined in claim 13, wherein a controller sends a signal to the moter that causes it to be in the vibration mode or the camera focus mode.

16. A method as described in claim 13, wherein the motor includes a motor shaft and step (c) comprises forcing the motor shaft to extend outward if the camera focus mode was desired in step (a).

17. A method as defined in claim 16, wherein when the motor shaft is extended outward it mates with a gear that adjusts the camera's focus when the motor shaft is turned.

18. A method as defined in claim 17, wherein the gear comprises a worm gear that mates with a gear found in the camera.

19. A method as defined in claim 18, wherein the motor shaft has chamfered ends that mate with a keyed aperture found in the worm gear that also has chamfered ends.

20. A method as defined in claim 18, wherein the motor shaft has a counter weight coupled to it.

* * * * *